(12) United States Patent
Coughlan (10) Patent No.: US 12,354,081 B2
(45) Date of Patent: Jul. 8, 2025

(54) DESTINATION ADDRESSING FOR TRANSACTIONS ASSOCIATED WITH A DISTRIBUTED LEDGER

(71) Applicant: nChain Licensing AG, Zug (CH)

(72) Inventor: Steven Coughlan, London (GB)

(73) Assignee: nChain Licensing AG, Zug (CH)

(*) Notice: Subject to any disclaimer, the term of this patent is extended or adjusted under 35 U.S.C. 154(b) by 49 days.

(21) Appl. No.: 17/788,276

(22) PCT Filed: Dec. 11, 2020

(86) PCT No.: PCT/IB2020/061807
§ 371 (c)(1),
(2) Date: Jun. 22, 2022

(87) PCT Pub. No.: WO2021/130586
PCT Pub. Date: Jul. 1, 2021

(65) Prior Publication Data
US 2023/0036694 A1 Feb. 2, 2023

(30) Foreign Application Priority Data
Dec. 24, 2019 (GB) ..................................... 1919298

(51) Int. Cl.
G06Q 20/36 (2012.01)
H04L 9/08 (2006.01)
H04L 9/32 (2006.01)

(52) U.S. Cl.
CPC ......... G06Q 20/367 (2013.01); H04L 9/0861 (2013.01); H04L 9/3226 (2013.01)

(58) Field of Classification Search
None
See application file for complete search history.

(56) References Cited

U.S. PATENT DOCUMENTS

2017/0344988 A1* 11/2017 Cusden .................. G06F 21/00
2017/0346804 A1* 11/2017 Beecham ................ H04L 63/08
(Continued)

FOREIGN PATENT DOCUMENTS

WO 2017187395 11/2017

OTHER PUBLICATIONS

Gueron, S., Johnson, S. and Walker, J., 2011, April. SHA-512/256. In 2011 Eighth International Conference on Information Technology: New Generations (pp. 354-358). IEEE (Year: 2011).*

(Continued)

*Primary Examiner* — Luu T Pham
*Assistant Examiner* — Edward X Long
(74) *Attorney, Agent, or Firm* — Messner Reeves LLP (57) ABSTRACT

The present disclosure proposes computer implemented methods, devices and systems for implementing an addressing service for transactions associated with a distributed ledger, wherein an alias is provided for a client among one or more clients associated with the addressing service, the alias being specific to the client. The method comprises the steps of
obtaining or accessing a plurality of seed words; for a given alias associated with a given client among the one or more clients, encoding the alias and applying a hash function to the encoded alias to obtain a hash value; extracting a first series from the hash value; and determining at least one seed word from the plurality of seed words based on the first series, the at least one seed word representing a code for the given alias.

13 Claims, 4 Drawing Sheets

(56) References Cited

U.S. PATENT DOCUMENTS

| | | |
|---|---|---|
| 2019/0057362 A1 | 2/2019 | Wright |
| 2020/0137096 A1* | 4/2020 | Endler .................. H04L 63/083 |
| 2020/0193420 A1* | 6/2020 | Vogel ................. G06Q 20/3829 |
| 2021/0089500 A1* | 3/2021 | Ball ........................ H04L 67/06 |

OTHER PUBLICATIONS

Pardeshi, M.S., Sheu, R.K. and Yuan, S.M., 2022. Hash-chain fog/edge: a mode-based hash-chain for secured mutual authentication protocol using zero-knowledge proofs in fog/edge. Sensors, 22(2), p. 607. (Year: 2022).*

Lin, C., He, D., Kumar, N., Huang, X., Vijayakumar, p. and Choo, K.K.R., 2019. HomeChain: A blockchain-based secure mutual authentication system for smart homes. IEEE Internet of Things Journal, 7(2), pp. 818-829. (Year: 2019).*

PCT/IB2020/016807 International Search Report and Written Opinion dated Feb. 23, 2021.

Tooba Faisal et al: "The Evolution of Embedding Metadata in Blockchain Transactions", arxiv.org, Cornell University Library, 201 Olin Library Cornell University Ithaca, NY 14853, Jun. 18, 2018 {Jun. 18, 2018), XP080891797, the whole document.

GB1919298.8 Abbreviated Examination Report dated Jun. 10, 2020.

* cited by examiner

Figure 4

DESTINATION ADDRESSING FOR TRANSACTIONS ASSOCIATED WITH A DISTRIBUTED LEDGER

CROSS REFERENCE TO RELATED APPLICATIONS

This application is the U.S. National Stage of International Application No. PCT/IB2020/061807 filed on Dec. 11, 2020, which claims the benefit of United Kingdom Patent Application No. 1919298.8, filed on Dec. 24, 2019, the contents of which are incorporated herein by reference in their entireties.

TECHNICAL FIELD

This disclosure relates generally to methods and systems for implementing an addressing service for one or more clients. Particularly, but not limited to, the present disclosure relates to facilitating transactions associated with a distributed ledger, and more particularly to methods for destination addressing for one or more of digital wallets.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers, public and private blockchains, and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain, and alternative blockchain implementations and protocols associated with any kind of digital asset or a representation of a digital asset fall within the scope of the present disclosure. The terms "client", "entity", "node", "user", "sender", "recipient", "payer", "payee" may refer herein to a computing or processor-based resource. The term "Bitcoin" is used herein to include any version or variation that derives from or is based on the Bitcoin protocol. The term "digital asset" may refer to any transferrable asset such as cryptocurrency, tokens representing at least a part of a property, a smart contract, a license, i.e. software licence, or DRM contracts for media content etc. It will be understood that the term digital asset is used throughout this document to represent a commodity that may be associated with value that may be transferred to or provided as a payment in a transaction from one entity to another.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid, and the transaction is then written to the blockchain. Thus, in order for a transaction to be written to the blockchain, it must be i) validated by the first node that receives the transaction-if the transaction is validated, the node relays it to the other nodes in the network; and ii) added to a new block built by a miner; and iii) mined, i.e. added to the public ledger of past transactions.

Once stored in the blockchain as a UTXO, a user can transfer control of the associated resource to another address associated with an input in another transaction. This transfer is usually, but not essentially, done using a digital wallet. This digital wallet may be a device, physical medium, program, application (app) on a computing device such as a desktop, laptop or a mobile terminal, or a remotely hosted service associated with a domain on a network work, such as the Internet. The digital wallet stores public and private keys and can be used to track ownership of resources, tokens and assets etc. associated with a user, receive or spend digital assets, transfer tokens which may relate to digital assets such as cryptocurrencies, or licences, or property, or other types of resource.

Although blockchain technology is most widely known for the use of cryptocurrency implementation, digital entrepreneurs are exploring the use of both the cryptographic security system Bitcoin is based on, and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper-proof records of events, distributed processing etc.) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results. Another area of blockchain-related interest is the use of 'tokens' (or 'coloured coins') to represent and transfer real-world entities via the blockchain. A potentially sensitive or secret item can be represented by the token which has no discernible meaning or value. The token thus serves as an identifier that allows the real-world item to be referenced from the blockchain.

The above-mentioned examples or scenarios relate to a transfer of some asset, i.e. a digital asset, or control of a digital asset between users or entities. Presently, in order to facilitate a BSV or other cryptocurrency payment between users, i.e. Alice and Bob, Alice would need to have a digital wallet associated with her (private and public) cryptographic keys and would need to know Bob's public address for sending cryptocurrencies, i.e. Bob's digital wallet address. The public addresses associated with an entity, herein a digital wallet, and are usually automatically generated by an address generation program. These public addresses are a string of digits in a specific format that is recognised by the cryptocurrency network and is used for transactions. For instance, these may be the Bitcoin addresses for BSV based cryptocurrency networks. This can be referred to as the public key or hash of the public key of the asymmetric private/key pair associated with an entity. Public addresses can be shared publicly so that other users know where to send payments in cryptocurrency to. However, public addresses which are recognised and used by the BSV wallet ecosystem or other cryptocurrency wallets are in formats such as:

17Dx2iAnGWPJCdqVvRFr45vL9YvT86TDsn.

Accordingly, Alice would need to know or be provided with this type of an address to send cryptocurrency to Bob. Furthermore, more than one type of address may be used by the entity or wallet for different types of transactions, and these addresses may only be used once to facilitate one transaction written on the blockchain. It will be evident that these public addresses are not in a user-friendly or simple to use or memorise format. Thus, these public addresses or keys for transactions would need to be identified or obtained or derived for each transaction, and further may need to be stored/cached for certain periods by an entity wishing to make a cryptocurrency payment to another entity.

Thus, while it is desirable to use blockchain technologies for recording data and events, as the blockchain provides advantages such as a tamper-proof and permanent record, there is a difficulty in identifying or establishing a destination address for a cryptocurrency payment or transaction. This is because the operable format of these addresses recognised in a digital wallet system is not simple or user friendly. One reason for this format could be the security aligned with it, along with specified naming protocols for public IP addresses applied across digital payment networks. Another reason is that the Bitcoin blockchain stores the data in transactions (Tx) which are built up into blocks. Identifying and then accessing the relevant data from the blockchain is based on the public address (linked to the private keys) of the entities involved in the transaction.

To make addressing for blockchain transaction simpler, there already exist mechanisms where a memorable and more user-friendly alias is used instead of the complicated public address. Such a solution is proposed in U.S. patent application Ser. No. 16/384,696 and UK patent application number 1907180.2, both in the name of nChain Holdings Limited. These documents set out an alias based payment service and associated protocols, referred to as bsvalias payment service, where an alias is used for destination addressing instead of the public address of an entity. The alias in such a system is usually associated with a domain name of a recipient client entity and may be a URI or an email address. Thus, as long as a sender client or entity is aware of or is provided with the alias, this is sufficient for the bsvalias payment system or an alias based addressing mechanism.

Such an alias based addressing system is robust and tamper-proof, secure and accurate. However, it does require either an addressing service or payment service or indeed one or more client entities to provide or send their user-friendly and easily memorable alias to another entity, so that a transaction can then be progressed using the alias. This is not always error resistant, as for example errors or mistypes occur when copy/pasting from an email or URL or a website. Furthermore, in some situations the alias may be provided to a user or owner associated with another client or computing resource over a conversation, either in person or over a telephone. This could result in said other entity mishearing or even mistyping the alias when trying to generate the payment transaction. When the other entity attempts to make a digital asset transaction to the owner or the entity associated with the alias, there is then the danger of it either not going through, or more importantly this could provide an opportunity for a malign party or program to take advantage of such errors in aliases for intended recipients by either impersonation or eavesdropping based attacks. This renders such transactions and associated entities and system vulnerable to security and privacy breaches, and also results in lost digital assets.

Accordingly, there is a desire to implement a secure and robust system for transaction between two entities with a better user experience, less prone to errors, and an overall safer and better level of security. More particularly there is a desire to make use of distributed ledger (blockchain) technology and the advantages of increased security, transparency and reliability of alias based addressing mechanism that enables any client or entity to ensure that digital asset payments or transfers are secure, private, accurate and error resistant, thereby providing a reliable, lasting, tamper-proof and auditable record of such valid payments on the blockchain.

Such an improved solution has now been devised. The present disclosure addresses the technical concerns relating to errors associated with alias addressing mechanisms by providing aspects and embodiments for an improved destination identification and/or payment addressing for a cryptocurrency ecosystem.

SUMMARY

In one aspect, the present disclosure proposes computer implemented methods, devices and systems for implementing an addressing service for transactions associated with a distributed ledger, wherein an alias is provided for a client among one or more clients associated with the addressing service, the alias being specific to the client. The method comprises the steps of obtaining or accessing a plurality of seed words. For a given alias associated with a given client among the one or more clients, the method includes encoding the alias and applying a hash function to the encoded alias to obtain a hash value; extracting a first series from the hash value; determining at least one seed word from the plurality of seed words based on the first series, the at least one seed word representing a code for the given alias; and sending the code word to the client for use with the alias.

In another aspect, the present disclosure relates to computer implemented methods, devices and systems where a recipient client provides a respective alias along with a code associated with it so that other entities can make digital asset payments to it using the alias and the code.

In another aspect, the present disclosure relates to computer implemented methods, devices and systems where a sender client obtains both the alias as well as a code for making a digital asset payment to a recipient client, and further verifies that the alias is indeed for the intended recipient based on the code.

BRIEF DESCRIPTION OF THE DRAWINGS

Aspects and embodiments of the present disclosure will now be described, by way of example only, and with reference to the accompany drawings, in which.

DETAILED DESCRIPTION

Although known alias based addressing and payment mechanisms, such as bsvalias mentioned above, provides an easy and user-friendly mechanism to enable a client or entity to pay a recipient or transfer a digital asset to a recipient via a distributed ledger transaction (blockchain transaction), they are not fully fool-proof and error resistant, especially to manual or human error.

Payment services like bsvalias mentioned in the background section solve the problem of transaction output resolution for blockchain transactions, as all that is needed to enable a sender to pay or send an asset is to provide them with the recipient's alias. Once this alias is included in the sender's address book, which may be implemented in the sender's digital wallet, payments and transactions to the alias can be made, for instance using instructions provided in a machine readable resource such as a JSON document for the bsvalias or other payment service. Although the process of giving a sender an alias to use for a payment should normally be simple, it is not always error resistant. Copy/pasting from an email or receiving the alias via a URL is normally less prone to errors in applying the alias, but mistakes can occur if the sender is manually entering the alias in the address book or the sender may miss out a line or word or character when typing the alias. More manual mechanism such as providing the alias via a face to face or a telephone conversation are more prone to errors, as the alias could be misheard or misunderstood to be something else that sounds similar to the alias. Such incorrect aliases that are entered into a senders address book are vulnerable to attacks and security breaches from malign parties who may try to impersonate the actual recipient by linking their own public address or a public address of another malign computing resource to the incorrect alias that appears to the sender to be linked to the actual intended recipient, when it is not so. Any payments or transactions made using the misheard or misspelt alias will then reach the malign party instead of the actual intended recipient which compromises the privacy and security that is offered by the distributed ledger. Such attacks in misspelled payment aliases are akin to attacks where malign parties obtain control over misspelled domain names. Currently, a mechanism for verifying a domain name address is checksums, which may be used for verifying and authenticating most machine to machine communications. But this mechanism cannot be applied in a similar manner to a human readable addressing mechanism such as an alias based addressing system for facilitating payment transactions to an alias that is user-friendly, instead of a complicated machine readable public address.

The below aspects and embodiment of the present disclosure address the above mentioned issues concerning errors in alias based addressing mechanism.

A first aspect of the present disclosure provides a computer implemented method of implementing an addressing service for transactions associated with a distributed ledger, wherein an alias is provided for a client among one or more clients associated with the addressing service, the alias being specific to the client. Each client among the one or more clients is provided with a respective alias. The alias may include or relate to a network identifier, such as a domain name for the client or an email address associated with the domain. In some embodiments, the addressing service is an alias based payment service such as the bsvalias payment service mentioned above in the background section, where an alias is used for destination addressing, instead of the public address of a client or a digital wallet for the client. The method of this aspect is implemented by one or more processors associated with the addressing service and comprises the steps of obtaining or accessing a plurality of seed words. In some embodiments, the plurality of seed words may be passphrases for use with a computing resource, such as a digital wallet that may implement the functionality of the addressing service. For example, this may be the set of 2048 seed words that most cryptocurrency handling digitals wallets utilise presently. These seed words are provided in Table 1 in the description of FIG. 1 below Then, for a given alias associated with a given client among the one or more clients, the method includes the step of encoding the alias. In some embodiments, the alias is encoded in a UTF-8 (8-bit Unicode Transformation Format) that uses 8-bit blocks to represent a character. In some embodiments the result of the encoding is a 32 byte number. The method then includes applying a hash function to the encoded alias to obtain a hash value. In some embodiments the hash function may be a secure hash algorithm, such as SHA 1, SHA 2 or SHA 256.

The method then includes extracting a first series from the hash value. In some embodiments, the first series is a series of integers. Herein after, the first series will be referred to as the first series of integers, but the present disclosure is not to be considered limited to such embodiment. In some embodiments, this step includes extracting a series of 11 bit numbers from the 32 byte encoded alias, so that 2048 different integers can be represented with 11 bits. This is advantageous as it corresponds with the 2048 seed words considered in the previous step. The first series of integers is then used to choose at least one word from the seed words in table 1.

In some embodiments, the first series is used to extract a first set of checksum words and may be referred to as a possible word list.

Next, the method includes determining at least one seed word from the plurality of seed words based on the first series of integers, the at least one seed word representing a code for the given alias. In some embodiments the method includes choosing a plurality of seed words based on the first series. Once the seed word or words are determined, the code is provided to the client associated with the given alias. In some embodiments, the code is used to verify the alias associated with the intended recipient. This code may be a confirmation word that is associated with the alias. For instance, both the code and the alias are provided to the client, and the client can in turn send both the code and the alias to a further client that wishes to conduct a transaction with it. In some embodiments, the addressing service is configured to provide a notification to a client that requests a transaction pertaining to the alias, this notification being the code or related to the code. As both code and alias are provided to a sender or payee-if the alias is wrong or misheard at the sender end, this can be identified as any confirmation word or code associated with a different or incorrect alias will not match the code that is unique to the alias for the actual intended recipient.

In some embodiments, the combination of the alias and the code word is stored in a memory or data storage module associated with the addressing service. This memory may be integral with the addressing service or may be remotely hosted or located. In some embodiments, the client can be integrated with the addressing service or may be a separate computing device remote to the addressing service.

In some embodiments, the addressing service and the one or more clients referred to above relate to one or more entities such as computing resources, user terminals or applications associated with a computing resource. In some embodiments, each client associated with the addressing service may be a digital wallet or may be an entity that is associated with a digital wallet, such as a user terminal having a digital wallet or application for a digital wallet installed. Although the aspects and embodiments of the present disclosure relate to digital wallets, it is to be understood that client entities not having a digital wallet or a separate application for one, but which are configured to provide the functionality for operating as or with or similar to digital wallet are also within the scope of this disclosure. For ease of explanation alone, the following description relate to digital wallets (client entities associated with a digital wallet), but the disclosure is in no way limited to client entities with digital wallets alone. The one or more digital wallets referred above is one of a plurality of digital wallets in a network, sometimes referred to an ecosystem of digital wallets, such as a wallet ecosystem of a plurality of Bitcoin BSV cryptocurrency wallets. In other embodiments, the wallet may not be part of a network of wallets and may simply be a separate, stand-alone entity that is associated with a domain.

Advantageously, the method according to the first aspect provides a technique for enabling alias based addressing for transactions pertaining to a distributed ledger in a manner that is user-friendly, error resistant and improves the security, reliability and accuracy of such transactions. This is because, along with an alias for a given public address, such as a recipient public address, a code that is derived from the recipient's alias is also provided to a sender. The code is specific to the a given client's alias, i.e. the recipient in this case, as it is derived based on a hash of an encoded form of the alias. Based on a hash value obtained, a word from a set of defined or predefined or well-known seed words is then chosen to be the code associated with the given alias. Thus, both the code and the alias are used in the present disclosure. This advantageously ensures that the alias is valid and does indeed relate to the intended recipient of a payment or a transaction. Both the alias as well as the code are provided to a sender to make a transaction with a recipient client associated with the alias. If the code does not match or if a verification criterion based on the alias does not produce or indicate the code, it can be determined by the sender that there is something wrong with the alias. This is because, each alias will have its own unique code calculated based on its own hash value. If the alias is wrong or misheard at the sender end, this can be easily determined as any word or code associated with a different or incorrect alias will simply not match the code that is unique to the intended recipient. Therefore, the present disclosure provided an error-resistant and tamper-proof technique for alias based addressing mechanisms pertaining to a block chain transaction.

In some embodiments, the method comprises receiving an input representing a number of words for the given client and determining said number or the same number of seed words for the code associated with the given alias. Thus, an input is received at the addressing service from the client to specify the number of words that make up the code associated with the given alias.

Advantageously, this feature relating to choosing of the number of words for a code associated with the alias allows the client to choose the strength of the code or the confirmation word associated with the alias. The more words in a code, the lower the potential error rate. For instance, if the code is from the pre-defined set of seed words then for a single word the error rate is one in 2048, and double that if there are two words. Further, this assumes that the alias is mistyped and that the mistyped address actually related to another valid alias, but for a different client that may or may not be a malign party. If we consider the chance of the above assumption happening is 1 in a 1000, then with a single word in a code for an alias, the error rate is 1 in (2048*1000), so about 1 in 2 million. If the client added a second word for the code, the error rate jumps to about 1 in 4 billion. At 4 words the error may almost never occur.

In some embodiments, the hash function is re-applied to the obtained hash value to obtain a further hash value, the further hash value providing a further series of integers. In related embodiments the hash function is further reapplied at least once, each further reapplication being to a respective previously obtained further hash value.

Advantageously, the SHA256 or any other hash that is used in the first aspect to the alias, can be applied again (and potentially many more times) to produce or extract a range of words lists or further series, similar to first series from the hash value of each further hash produced. Thus a code can be chosen from one of the further series based on a respective further hash value. This provides added layers of security, as even if a malign party can obtain the set of seed words and details of a hash used for a recipient client's alias, it will be very difficult to obtain or guess the code that is unique to the recipient client if multiple hashes are used to generate this code.

In some embodiments, the method comprising the steps of updating a machine readable resource associated with the addressing service, the machine readable resource being provided at or accessible from a predictable or known location associated with the addressing service, the machine readable resource comprising one or more instructions for accessing or obtaining a public address associated with a given alias, the public address used for facilitating transactions associated with the alias, and an entry specifying the number of hashes required to produce one or more series of integers for the code associated with a given client.

Advantageously, the provision of the machine readable document associated with the addressing service enables the generation of a suitable request to a client associated with the addressing service pertaining to distributed ledger transaction with knowledge of the just the alias. This advantage is ensured by the provision of a publicly accessible machine readable resource that specifies one or more functions or templates or protocols offered by the addressing service. In some embodiments, the known or predictable location of the machine readable resource is based on at least an endpoint identifier or an Internet protocol communication port used by the addressing service. Advantageously, the above enables the machine readable resource to be easily located based on either a name of the addressing service or the domain name associated with a network identifier.

As noted in the above embodiment, the machine language resource may also include an indication of the number of hashes used to generate the series of integers based on which a seed word or words are determined as the code for the alias. This is advantageous as it keeps a record of the number of hashes used for a given client (or alias associated with the client) and is useful in case the source of the code may need to be verified or regenerated. In some embodiments, the machine readable resource is generated using a Java Script Object Notation (JSON) format. This is advantageous, as JSON is a lightweight data-interchange format which, although primarily being a machine readable language, is also easy for humans to read and write. It is easy for machines to parse and generate, thereby making it an ideal data-interchange language for generating the machine readable resource.

In some embodiments where the alias is associated with a domain name as indicated above, the method includes providing an entry associated with the domain name in a directory, said entry specifying the number of hashes required to produce the one or more series of integers for the code associated with a given client. This is advantageous in embodiments where a machine readable resource is not present, and instead the addressing service uses a different directory or database for recording the number of hashes used to obtain the series of integers from which the code is determined for a given alias.

The directory referred herein is usually a decentralised directory that is open, i.e. accessible publicly by all users. For example, a global directory such as the Domain Name Server (DNS) can be used, which is decentralised and open such that it is accessible by any entity or users from anywhere over the Internet. While the open, accessible and decentralised directory is a preferred implementation, the present disclosure is not limited to this. In some embodiments, the directory referred may also be a centralised directory. In other embodiments the directory may be a closed directory, i.e. one that is accessible to users or entities registered with a network or service. Henceforth, a reference to a global directory such as the DNS will be in the description for ease of explanation. It will be understood by a skilled person that other types of directories are also within the scope of this disclosure.

In some embodiments, this entry may be in a DNS TXT record format, specifying exactly how many hashes are required to produce the series or list of words from which the code is obtained for a given alias. Potentially, a plurality of options for the number of hashes is also possible. In practice, there may be a tendency to limit the number of allowed options for the number of hashes for one code word, as this may have the effect of reducing entropy (because given a set of word combinations its likely many users would tend to choose some more often than others), but this can be mitigated by using an additional word in the code.

In some embodiments, the method comprises identifying a plurality of variations of the given alias. For each variation identified, the method then includes the steps similar to that applied for the alias in the first aspect explained above, i.e. for each variation the method includes the step of encoding the variation, then applying a hash function to the encoded variation in order to obtain a variation hash value (for the variation). The method also includes extracting a second series of integers from the variation hash value.

The method further includes the step of comparing the second series of integers with the first series of integers as set out in the first aspect and/or one or more further series of integers associated with the given alias. Then based on a collision criterion, the method includes the step of disregarding one or more of the first and/or further series of integers for determining a code for the given alias. Thus, considering the series of integers as word lists from which a code word can be chosen for a given alias, the ones that do not meet the criterion are disregarded. In some embodiments, the collision criterion is based on a Levenshtein distance threshold, the Levenshtein distance being distance between the respective series of integers being compared.

Advantageously, security can be further increase and the chance of errors can be further reduced by using a brute force type approach to known or plausible variations of a given alias.

By calculating all the likely misspellings as well as words that are similar sounding to a particular alias, a second series of integers that can be used for obtaining a list of words for those variations can be determined and compared with the first or further series relating to the actual alias. Collisions can then be determined by for instance checking if the series being compared are within a certain Levenshtein distance of each other and eliminating those colliding lists from the choices available for determining a code. Advantageously, this enables use of a larger number of series or word lists to choose from, whilst maintaining a collision resistance property with known or expected variations. In some embodiments, the Levenshtein distance can be a criterion checked for one or more individual words among the seed words that correspond to respective one or more words in the first and second or further series. This advantageously ensures that the same or similar code words are not chosen by for alias and it's one or more known or similar sounding variations.

A second aspect of the present disclosure relates to a computer implemented method associated with a transaction for a distributed ledger, wherein an alias is provided for a client among one or more clients associated with an addressing service, the alias being specific to the client, each client being associated with a respective alias. In this aspect the method implemented by one or more processors associated with a recipient client among the one or more clients. The method comprises the steps of providing the alias associated with the client to an addressing service. In some embodiments, if the client is provided in the same computing system or devices as the addressing service, or the client is a sophisticated client that can also implement the functionality of the addressing service, then such step or providing includes allowing or enabling access to the alias for the client.

The method then includes providing a number of words for a code that is to be associated with the alias to the addressing service. As mentioned above in relation to the first aspect, the greater the number of words, the further security is increased, as there is now more than one word that will need to be matched for an alias. The chances of a malign party being able to somehow match a plurality of code words to an incorrect alias is low.

The method then includes obtaining the code from the addressing service or accessing this code if the client and addressing service are co-located. The method includes sending the alias and the associated code to a sender client for use in a transaction associated with the distributed ledger for the client, the client being the recipient for said transaction. The step of sending can take place over any means of communication between the sender and the recipient, such as via email or in person or over the phone. Both the code and the alias is provided, so that the alias can be verified or checked to see that it does relate to the intended recipient based on the code In some embodiments, the client entity also implements the addressing service in the case of a more sophisticated client. In some embodiments, the addressing service is a computing resource integrated with the client. In alternative embodiments, the addressing service is an entity remote or separate to the client, wherein the client is communicatively coupled to the addressing service via a wired or wireless communication network.

In a third aspect the present disclosure relates to a computer implemented method associated with a transaction for a distributed ledger, wherein an alias is provided for a client among one or more clients associated with an addressing service, the alias being specific to the client, each client being associated with a respective alias. In this aspect the method is implemented by one or more processors associated with a sender client among the one or more clients. The method comprising the steps of receiving an alias for a recipient client, the alias being associated with a public address for the recipient client. In some embodiments this may be or associated with a domain name for the recipient client, such as an email address.

The method also includes receiving a code associated with the received alias. In some embodiments the alias and the code may be entered or input into the sender client by an owner or user of a computing device associated with the sender via a user interface. This may be following a receipt of the alias and code over the phone or a different communication means, such as email. In this case, the code may be copied into a digital wallet associated with the sender.

The method then includes generating a transaction associated with the distributed ledger based on the alias. This may be automatically performed in a digital wallet or computing device of the sender client for sending a transaction or a digital asset to the recipient.

The method includes the step of obtaining a notification related to the alias. This may be a text based, audio based, or image based notification or a combination of the three. In some embodiments, the notification is sent from or associated with the addressing service that is associated with the recipient client, as discussed in relation to the first aspect.

Based on a determination that the received notification matches the received code; the generated transaction is then sent to the recipient client based on the alias. This sending may take place using the protocols proposed for the bsvalias based payment service as explained in the background, for instance. Any other alias based addressing service can also be used.

If the notification does not match the received code, then the method includes disregarding or deleting the generated transaction, as this is an indication that the alias is incorrect and does not link to the intended recipient of the transaction.

The disclosure also provides a computing device, comprising: a processor; and memory including executable instructions that, as a result of execution by the processor, causes the computing device to perform any aspect or embodiment of the computer-implemented methods described herein. The disclosure also provided a system includes a plurality of such computing devices that are operable together to implement any aspect or embodiment discussed above.

The disclosure also provides a non-transitory computer-readable storage medium having stored thereon executable instructions that, as a result of being executed by a processor of a computing device or system, cause the computing device or system to at least perform one aspect or embodiment of the computer-implemented methods described herein.

Some specific embodiments are now described by way of illustration with reference to the accompanying drawings, in which like reference numerals refer to like features.

Figure 1:
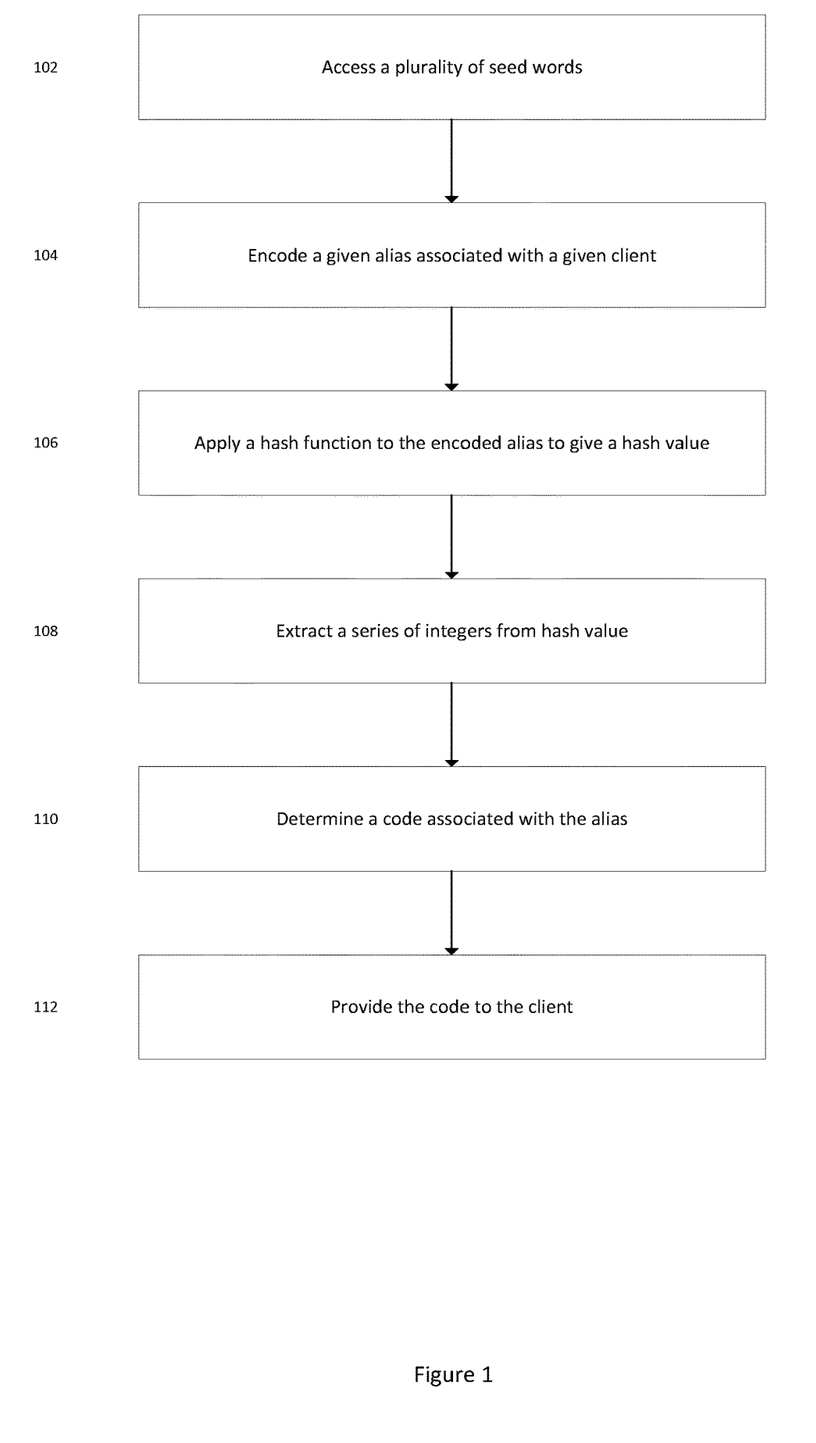
FIG. 1 is a flowchart depicting a method for implementing an addressing service for enabling transactions associated with a blockchain for one or more clients, each client having a specific alias, the method implemented by one or more processors associated with the addressing service.

FIG. 1 of the present disclosure depicts a method performed by one or more processor implementing an addressing service for one or more clients, as discussed above.

Step 102 depicts the step of obtaining or accessing a plurality of seed words. In some examples, the set of seed words may be from a defined set, such as the known set of 2048 seed words that are presently used or implemented by digital wallets. The seed words may be stored in a memory that is local to or associated with the addressing service.

The set of 2048 seed words that are current used as digital wallet passphrases are given in the table below:

| | | | | | | | | | |
|---|---|---|---|---|---|---|---|---|---|
| abandon | amount | avoid | blossom | cactus | chimney | copy | day | divorce | elite |
| ability | amused | awake | blouse | cage | choice | coral | deal | dizzy | else |
| able | analyst | aware | blue | cake | choose | core | debate | doctor | embark |
| about | anchor | away | blur | call | chronic | corn | debris | document | embody |
| above | ancient | awesome | blush | calm | chuckle | correct | decade | dog | embrace |
| absent | anger | awful | board | camera | chunk | cost | december | doll | emerge |
| absorb | angle | awkward | boat | camp | churn | cotton | decide | dolphin | emotion |
| abstract | angry | axis | body | can | cigar | couch | decline | domain | employ |
| absurd | animal | baby | boil | canal | cinnamon | country | decorate | donate | empower |
| abuse | ankle | bachelor | bomb | cancel | circle | couple | decrease | donkey | empty |
| access | announce | bacon | bone | candy | citizen | course | deer | donor | enable |
| accident | annual | badge | bonus | cannon | city | cousin | defense | door | enact |
| account | another | bag | book | canoe | civil | cover | define | dose | end |
| accuse | answer | balance | boost | canvas | claim | coyote | defy | double | endless |
| achieve | antenna | balcony | border | canyon | clap | crack | degree | dove | endorse |
| acid | antique | ball | boring | capable | clarify | cradle | delay | draft | enemy |
| acoustic | anxiety | bamboo | borrow | capital | claw | craft | deliver | dragon | energy |
| acquire | any | banana | boss | captain | clay | cram | demand | drama | enforce |
| across | apart | banner | bottom | car | clean | crane | demise | drastic | engage |
| act | apology | bar | bounce | carbon | clerk | crash | denial | draw | engine |
| action | appear | barely | box | card | clever | crater | dentist | dream | enhance |
| actor | apple | bargain | boy | cargo | click | crawl | deny | dress | enjoy |
| actress | approve | barrel | bracket | carpet | client | crazy | depart | drift | enlist |
| actual | april | base | brain | carry | cliff | cream | depend | drill | enough |
| adapt | arch | basic | brand | cart | climb | credit | deposit | drink | enrich |
| add | arctic | basket | brass | case | clinic | creek | depth | drip | enroll |
| addict | area | battle | brave | cash | clip | crew | deputy | drive | ensure |
| address | arena | beach | bread | casino | clock | cricket | derive | drop | enter |
| adjust | argue | bean | breeze | castle | clog | crime | describe | drum | entire |

-continued

| | | | | | | | | | |
|---|---|---|---|---|---|---|---|---|---|
| admit | arm | beauty | brick | casual | close | crisp | desert | dry | entry |
| adult | armed | because | bridge | cat | cloth | critic | design | duck | envelope |
| advance | armor | become | brief | catalog | cloud | crop | desk | dumb | episode |
| advice | army | beef | bright | catch | clown | cross | despair | dune | equal |
| aerobic | around | before | bring | category | club | crouch | destroy | during | equip |
| affair | arrange | begin | brisk | cattle | clump | crowd | detail | dust | era |
| afford | arrest | behave | broccoli | caught | cluster | crucial | detect | dutch | erase |
| afraid | arrive | behind | broken | cause | clutch | cruel | develop | duty | erode |
| again | arrow | believe | bronze | caution | coach | cruise | device | dwarf | erosion |
| age | art | below | broom | cave | coast | crumble | devote | dynamic | error |
| agent | artefact | belt | brother | ceiling | coconut | crunch | diagram | eager | erupt |
| agree | artist | bench | brown | celery | code | crush | dial | eagle | escape |
| ahead | artwork | benefit | brush | cement | coffee | cry | diamond | early | essay |
| aim | ask | best | bubble | census | coil | crystal | diary | earn | essence |
| air | aspect | betray | buddy | century | coin | cube | dice | earth | estate |
| airport | assault | better | budget | cereal | collect | culture | diesel | easily | eternal |
| aisle | asset | between | buffalo | certain | color | cup | diet | east | ethics |
| alarm | assist | beyond | build | chair | column | cupboard | differ | easy | evidence |
| album | assume | bicycle | bulb | chalk | combine | curious | digital | echo | evil |
| alcohol | asthma | bid | bulk | champion | come | current | dignity | ecology | evoke |
| alert | athlete | bike | bullet | change | comfort | curtain | dilemma | economy | evolve |
| alien | atom | bind | bundle | chaos | comic | curve | dinner | edge | exact |
| all | attack | biology | bunker | chapter | common | cushion | dinosaur | edit | example |
| alley | attend | bird | burden | charge | company | custom | direct | educate | excess |
| allow | attitude | birth | burger | chase | concert | cute | dirt | effort | exchange |
| almost | attract | bitter | burst | chat | conduct | cycle | disagree | egg | excite |
| alone | auction | black | bus | cheap | confirm | dad | discover | eight | exclude |
| alpha | audit | blade | business | check | congress | damage | disease | either | excuse |
| already | august | blame | busy | cheese | connect | damp | dish | elbow | execute |
| also | aunt | blanket | butter | chef | consider | dance | dismiss | elder | exercise |
| alter | author | blast | buyer | cherry | control | danger | disorder | electric | exhaust |
| always | auto | bleak | buzz | chest | convince | daring | display | elegant | exhibit |
| amateur | autumn | bless | cabbage | chicken | cook | dash | distance | element | exile |
| amazing | average | blind | cabin | chief | cool | daughter | divert | elephant | exist |
| among | avocado | blood | cable | child | copper | dawn | divide | elevator | exit |
| exotic | fix | gas | gym | hybrid | job | length | marine | mosquito | object |
| expand | flag | gasp | habit | ice | join | lens | market | mother | oblige |
| expect | flame | gate | hair | icon | joke | leopard | marriage | motion | obscure |
| expire | flash | gather | half | idea | journey | lesson | mask | motor | observe |
| explain | flat | gauge | hammer | identify | joy | letter | mass | mountain | obtain |
| expose | flavor | gaze | hamster | idle | judge | level | master | mouse | obvious |
| express | flee | general | hand | ignore | juice | liar | match | move | occur |
| extend | flight | genius | happy | ill | jump | liberty | material | movie | ocean |
| extra | flip | genre | harbor | illegal | jungle | library | math | much | october |
| eye | float | gentle | hard | illness | junior | license | matrix | muffin | odor |
| eyebrow | flock | genuine | harsh | image | junk | life | matter | mule | off |
| fabric | floor | gesture | harvest | imitate | just | lift | maximum | multiply | offer |
| face | flower | ghost | hat | immense | kangaroo | light | maze | muscle | office |
| faculty | fluid | giant | have | immune | keen | like | meadow | museum | often |
| fade | flush | gift | hawk | impact | keep | limb | mean | mushroom | oil |
| faint | fly | giggle | hazard | impose | ketchup | limit | measure | music | okay |
| faith | foam | ginger | head | improve | key | link | meat | must | old |
| fall | focus | giraffe | health | impulse | kick | lion | mechanic | mutual | olive |
| false | fog | girl | heart | inch | kid | liquid | medal | myself | olympic |
| fame | foil | give | heavy | include | kidney | list | media | mystery | omit |
| family | fold | glad | hedgehog | income | kind | little | melody | myth | once |
| famous | follow | glance | height | increase | kingdom | live | melt | naive | one |
| fan | food | glare | hello | index | kiss | lizard | member | name | onion |
| fancy | foot | glass | helmet | indicate | kit | load | memory | napkin | online |
| fantasy | force | glide | help | indoor | kitchen | loan | mention | narrow | only |
| farm | forest | glimpse | hen | industry | kite | lobster | menu | nasty | open |
| fashion | forget | globe | hero | infant | kitten | local | mercy | nation | opera |
| fat | fork | gloom | hidden | inflict | kiwi | lock | merge | nature | opinion |
| fatal | fortune | glory | high | inform | knee | logic | merit | near | oppose |
| father | forum | glove | hill | inhale | knife | lonely | merry | neck | option |
| fatigue | forward | glow | hint | inherit | knock | long | mesh | need | orange |
| fault | fossil | glue | hip | initial | know | loop | message | negative | orbit |
| favorite | foster | goat | hire | inject | lab | lottery | metal | neglect | orchard |
| feature | found | goddess | history | injury | label | loud | method | neither | order |
| february | fox | gold | hobby | inmate | labor | lounge | middle | nephew | ordinary |
| federal | fragile | good | hockey | inner | ladder | love | midnight | nerve | organ |
| fee | frame | goose | hold | innocent | lady | loyal | milk | nest | orient |
| feed | frequent | gorilla | hole | input | lake | lucky | million | net | original |
| feel | fresh | gospel | holiday | inquiry | lamp | luggage | mimic | network | orphan |
| female | friend | gossip | hollow | insane | language | lumber | mind | neutral | ostrich |
| fence | fringe | govern | home | insect | laptop | lunar | minimum | never | other |
| festival | frog | gown | honey | inside | large | lunch | minor | news | outdoor |
| fetch | front | grab | hood | inspire | later | luxury | minute | next | outer |
| fever | frost | grace | hope | install | latin | lyrics | miracle | nice | output |

-continued

| | | | | | | | | | |
|---|---|---|---|---|---|---|---|---|---|
| few | frown | grain | horn | intact | laugh | machine | mirror | night | outside |
| fiber | frozen | grant | horror | interest | laundry | mad | misery | noble | oval |
| fiction | fruit | grape | horse | into | lava | magic | miss | noise | oven |
| field | fuel | grass | hospital | invest | law | magnet | mistake | nominee | over |
| figure | fun | gravity | host | invite | lawn | maid | mix | noodle | own |
| file | funny | great | hotel | involve | lawsuit | mail | mixed | normal | owner |
| film | furnace | green | hour | iron | layer | main | mixture | north | oxygen |
| filter | fury | grid | hover | island | lazy | major | mobile | nose | oyster |
| final | future | grief | hub | isolate | leader | make | model | notable | ozone |
| find | gadget | grit | huge | issue | leaf | mammal | modify | note | pact |
| fine | gain | grocery | human | item | learn | man | mom | nothing | paddle |
| finger | galaxy | group | humble | ivory | leave | manage | moment | notice | page |
| finish | gallery | grow | humor | jacket | lecture | mandate | monitor | novel | pair |
| fire | game | grunt | hundred | jaguar | left | mango | monkey | now | palace |
| firm | gap | guard | hungry | jar | leg | mansion | monster | nuclear | palm |
| first | garage | guess | hunt | jazz | legal | manual | month | number | panda |
| fiscal | garbage | guide | hurdle | jealous | legend | maple | moon | nurse | panel |
| fish | garden | guilt | hurry | jeans | leisure | marble | moral | nut | panic |
| fit | garlic | guitar | hurt | jelly | lemon | march | more | oak | panther |
| fitness | garment | gun | husband | jewel | lend | margin | morning | obey | paper |
| parade | pool | quote | retreat | scale | siege | source | submit | theme | trend |
| parent | popular | rabbit | return | scan | sight | south | subway | then | trial |
| park | portion | raccoon | reunion | scare | sign | space | success | theory | tribe |
| parrot | position | race | reveal | scatter | silent | spare | such | there | trick |
| party | possible | rack | review | scene | silk | spatial | sudden | they | trigger |
| pass | post | radar | reward | scheme | silly | spawn | suffer | thing | trim |
| patch | potato | radio | rhythm | school | silver | speak | sugar | this | trip |
| path | pottery | rail | rib | science | similar | special | suggest | thought | trophy |
| patient | poverty | rain | ribbon | scissors | simple | speed | suit | three | trouble |
| patrol | powder | raise | rice | scorpion | since | spell | summer | thrive | truck |
| pattern | power | rally | rich | scout | sing | spend | sun | throw | true |
| pause | practice | ramp | ride | scrap | siren | sphere | sunny | thumb | truly |
| pave | praise | ranch | ridge | screen | sister | spice | sunset | thunder | trumpet |
| payment | predict | random | rifle | script | situate | spider | super | ticket | trust |
| peace | prefer | range | right | scrub | six | spike | supply | tide | truth |
| peanut | prepare | rapid | rigid | sea | size | spin | supreme | tiger | try |
| pear | present | rare | ring | search | skate | spirit | sure | tilt | tube |
| peasant | pretty | rate | riot | season | sketch | split | surface | timber | tuition |
| pelican | prevent | rather | ripple | seat | ski | spoil | surge | time | tumble |
| pen | price | raven | risk | second | skill | sponsor | surprise | tiny | tuna |
| penalty | pride | raw | ritual | secret | skin | spoon | surround | tip | tunnel |
| pencil | primary | razor | rival | section | skirt | sport | survey | tired | turkey |
| people | print | ready | river | security | skull | spot | suspect | tissue | turn |
| pepper | priority | real | road | seed | slab | spray | sustain | title | turtle |
| perfect | prison | reason | roast | seek | slam | spread | swallow | toast | twelve |
| permit | private | rebel | robot | segment | sleep | spring | swamp | tobacco | twenty |
| person | prize | rebuild | robust | select | slender | spy | swap | today | twice |
| pet | problem | recall | rocket | sell | slice | square | swarm | toddler | twin |
| phone | process | receive | romance | seminar | slide | squeeze | swear | toe | twist |
| photo | produce | recipe | roof | senior | slight | squirrel | sweet | together | two |
| phrase | profit | record | rookie | sense | slim | stable | swift | toilet | type |
| physical | program | recycle | room | sentence | slogan | stadium | swim | token | typical |
| piano | project | reduce | rose | series | slot | staff | swing | tomato | ugly |
| picnic | promote | reflect | rotate | service | slow | stage | switch | tomorrow | umbrella |
| picture | proof | reform | rough | session | slush | stairs | sword | tone | unable |
| piece | property | refuse | round | settle | small | stamp | symbol | tongue | unaware |
| pig | prosper | region | route | setup | smart | stand | symptom | tonight | uncle |
| pigeon | protect | regret | royal | seven | smile | start | syrup | tool | uncover |
| pill | proud | regular | rubber | shadow | smoke | state | system | tooth | under |
| pilot | provide | reject | rude | shaft | smooth | stay | table | top | undo |
| pink | public | relax | rug | shallow | snack | steak | tackle | topic | unfair |
| pioneer | pudding | release | rule | share | snake | steel | tag | topple | unfold |
| pipe | pull | relief | run | shed | snap | stem | tail | torch | unhappy |
| pistol | pulp | rely | runway | shell | sniff | step | talent | tornado | uniform |
| pitch | pulse | remain | rural | sheriff | snow | stereo | talk | tortoise | unique |
| pizza | pumpkin | remember | sad | shield | soap | stick | tank | toss | unit |
| place | punch | remind | saddle | shift | soccer | still | tape | total | universe |
| planet | pupil | remove | sadness | shine | social | sting | target | tourist | unknown |
| plastic | puppy | render | safe | ship | sock | stock | task | toward | unlock |
| plate | purchase | renew | sail | shiver | soda | stomach | taste | tower | until |
| play | purity | rent | salad | shock | soft | stone | tattoo | town | unusual |
| please | purpose | reopen | salmon | shoe | solar | stool | taxi | toy | unveil |
| pledge | purse | repair | salon | shoot | soldier | story | teach | track | update |
| pluck | push | repeat | salt | shop | solid | stove | team | trade | upgrade |
| plug | put | replace | salute | short | solution | strategy | tell | traffic | uphold |
| plunge | puzzle | report | same | shoulder | solve | street | ten | tragic | upon |
| poem | pyramid | require | sample | shove | someone | strike | tenant | train | upper |
| poet | quality | rescue | sand | shrimp | song | strong | tennis | transfer | upset |
| point | quantum | resemble | satisfy | shrug | soon | struggle | tent | trap | urban |

-continued

| polar | quarter | resist | satoshi | shuffle | sorry | student | term | trash | urge |
|---|---|---|---|---|---|---|---|---|---|
| pole | question | resource | sauce | shy | sort | stuff | test | travel | usage |
| police | quick | response | sausage | sibling | soul | stumble | text | tray | use |
| pond | quit | result | save | sick | sound | style | thank | treat | used |
| pony | quiz | retire | say | side | soup | subject | that | tree | useful |
| useless | vast | viable | visual | walk | wealth | what | window | wonder | wrong |
| usual | vault | vibrant | vital | wall | weapon | wheat | wine | wood | yard |
| utility | vehicle | vicious | vivid | walnut | wear | wheel | wing | wool | year |
| vacant | velvet | victory | vocal | want | weasel | when | wink | word | yellow |
| vacuum | vendor | video | voice | warfare | weather | where | winner | work | you |
| vague | venture | view | void | warm | web | whip | winter | world | young |
| valid | venue | village | volcano | warrior | wedding | whisper | wire | worry | youth |
| valley | verb | vintage | volume | wash | weekend | wide | wisdom | worth | zebra |
| valve | verify | violin | vote | wasp | weird | width | wise | wrap | zero |
| van | version | virtual | voyage | waste | welcome | wife | wish | wreck | zone |
| vanish | very | virus | wage | water | west | wild | witness | wrestle | zoo |
| vapor | vessel | visa | wagon | wave | wet | will | wolf | wrist | |
| various | veteran | visit | wait | way | whale | win | woman | write | |

Step 104 depicts the step of encoding a given alias associated with a given client among the one or more clients that are associated with the addressing service.

In some embodiments, the alias is provided by the respective client to the addressing service. In other embodiments, the addressing service may already be aware of or have access to the aliases in relation to each of the one or more clients associated with it. In some embodiments, a mapping or correlation of aliases with the respective public addresses associated with the clients may be stored at the addressing service, so that the aliases can be used instead of the public addresses. As mentioned above, the alias is unique for a particular client or wallet associated with the client and either includes a network identifier, such as the domain name, or a name that identifies that network. For example, the alias may be in the well-known email format, such as clientname@domainname.com, where the clientname may simply be the name or an identifier of the individual or company that signs up for or registers with the network, like Alice or Bob. The domain name in the alias may indicate an organisation or domain owner, for example "nChain". In this case, the alias for Alice would be alice@nchain.com. If Bob signs up to a different network that may have a domain name "notnchain", Bob's alias may be bob@notnchain.com. Other alias formats may also be used, such as AliceNC or BobBSV etc., as long as the alias is human readable and is associated with a network identifier, as in the cases with the alias based payment service, bsvalias. Let us assume that alice@nchain.com is the alias of the recipient client Alice in this embodiment.

As mentioned above, a UTF-8 (8-bit Unicode Transformation Format) character encoding may be used to encode an alias like or alice@nchain.com bob@chain.com in this embodiment. However, other types of encoding mechanisms may also be used, and the disclosure is not to be considered as being limited to a particular type. The UTF-8 is capable encoding all 1,112,064 valid code points in Unicode using one to four 8-bit bytes. UTF-8 is a compromise character encoding that can be as compact as ASCII but can also contain any Unicode characters. UTF-8 uses 8-bit blocks to represent a character.

In step 106 a hash function is applied to the encoded alias for alice@nchain.com obtained in step 104 to obtain a hash value. The hash function may be a secure hash algorithm such as SHA 256, but is not so limited. Other types of hashing mechanisms may also be used. The outcome of this step in some embodiments is a 32-byte number that represents the hash value. As mentioned above, the hash function in this step may be re-applied one or more further times, each reapplication providing a respective further hash value.

In step 108 a first series is obtained from the hash value obtained in step 106. In the embodiment of FIG. 1, the first series is a first series of integers. In some embodiments, this may be a first series of integers between 1 and 2048. The first series is obtained or based on the hash value that is obtained from the first application of the hash function for the encoded alias. In embodiments where the hash function is reapplied, a further series of integers is obtained from each respective further hash value obtained. The series of integers extracted in this step is a series of 11 bit numbers. 2048 different integers can be represented with 11 bits. This corresponds with the number of words in the seed word set in step 102.

In step 110 the code for the given alias is obtained based on the first series of integers (or the further series of integers, if the hash is reapplied). The code may be made up of one or more words among the seed words that corresponds to one or more respective integers in the first (or further) series of integers. In some embodiments, the number of words may be chosen by the client, i.e. Alice, and this may be done in advance of the computation of the code in this step. Let's us assume that Alice chooses 2 as the number of words to be associated with her alias alice@nchain.com for blockchain transactions. Thus, the first series of integers in step 108 is then used to select two words from the set of seed words. The words may be automatically assigned by the addressing service or chosen at random by the addressing service. In some embodiments, the first series may be provided to the client and the selection of the code words may be made by Alice, i.e. the recipient of a blockchain transaction. Let us assume that the code word for alice@nchain.com chosen based on the first set of integers is "unique monkey".

In step 112, the code "unique monkey" is provided to the client, i.e. Alice's wallet or computing device. This code is to be sent along with the alias to any other entity or client wishing to make a payment or initiate a blockchain transaction with Alice.

Advantageously, according to the embodiments explained in FIG. 1, there are two items, the alias, alice@nchain.com as well as the code words, "unique monkey" that should be provided to an entity wishing to make a digital asset payment to the client, in this case the digital wallet or other computing device associated with Alice.

Let us suppose that a sender, Bob wishing to send a payment to Alice using her alias types in alise@nchain.com instead. If there does indeed exist a client entity relating to "Alise" having a digital wallet and associated with a valid alias of alise@nchain.com, then without implementing the steps of the first aspect of the present disclosure as exemplified in FIG. 1, this would result in a payment being made from Bob to Alise, and the associated transactions being provided to the blockchain, even though Alise was not the intended recipient for the payment.

However, when implementing the steps of the present disclosure according to a first aspect, if Bob wants to send a payment to Alice, in addition to the alias he will also be provided with her code, i.e. unique monkey in the above example. This code is specific to Alice's alias, alice@nchain.com. Therefore, as explained above and also further below in relation to FIG. 3, only if the correct alias is typed by Bob, will the confirmation code "unique money" be provided or displayed by the wallet or other devices associated with Bob to indicate that it has been confirmed that Bob is indeed making the payment to the correct alias for Alice. The confirmation code may be notified to Bob as soon as the alias is typed in. Supposed Bob types alise@nchain.com now, and assuming that for this valid alias the code is actually "blue blossom", then this code "blue blossom" will be notified instead of "unique monkey". In some embodiments it is the addressing service associated with a recipient client, Alice or Alise, that provides a notification relating to the associated code for the alias entered to the sender. The sender Bob on seeing a different code instead of the expected code will then know that the payment he is trying to make is not going to Alice, the intended recipient and can then abandon the transaction and try again by entering Alice's correct alias and double checking this alias against the code" unique monkey" in the notification.

Figure 2:
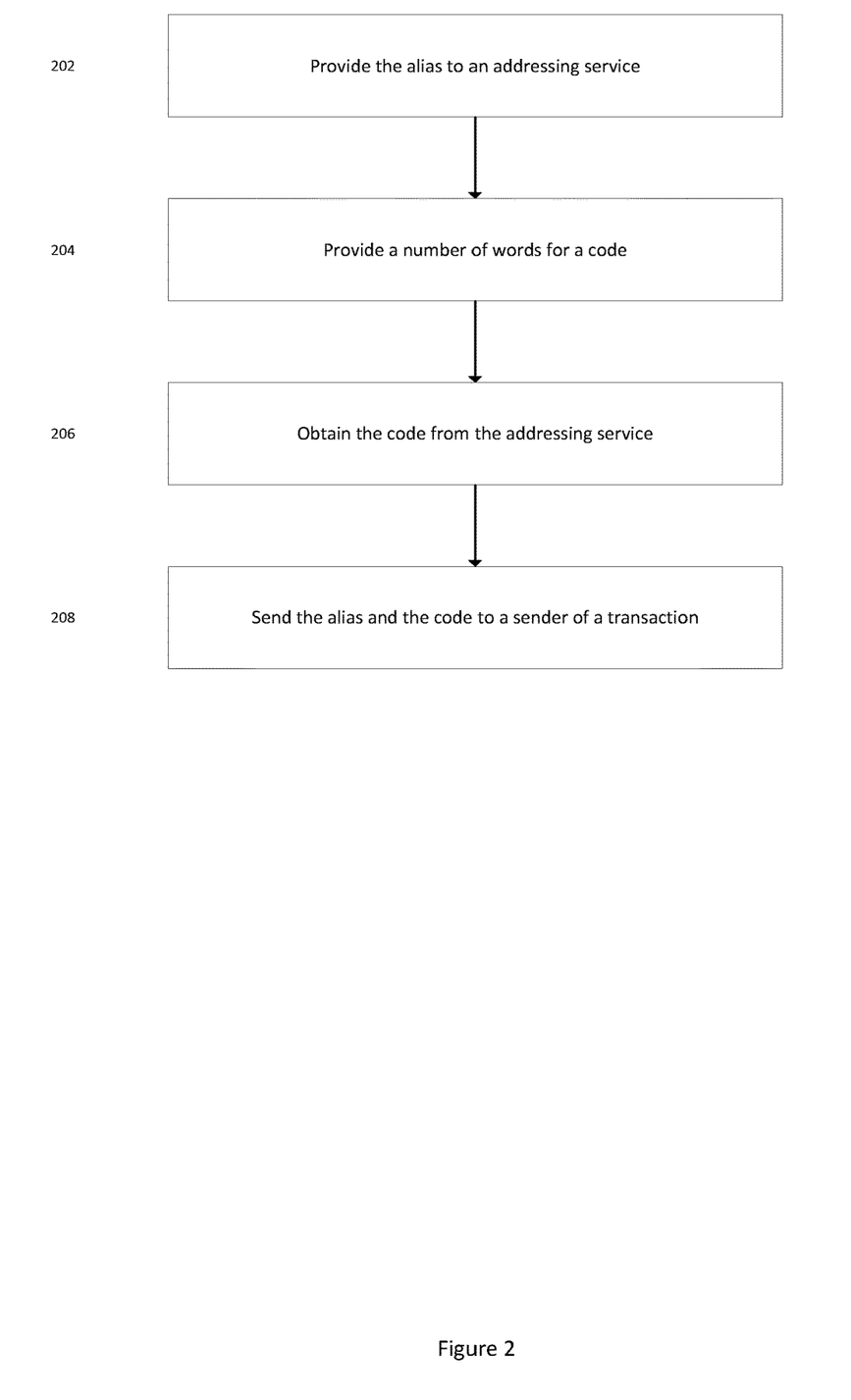
FIG. 2 is a flowchart depicting a method pertaining to blockchain transaction based on an alias for a recipient client, where the method is implemented by one or more processors associated of the recipient client.

FIG. 2 of the present disclosure depicts a method performed by one or more processors associated with a recipient client, i.e. Alice's device or digital wallet associated with a computing device for Alice, where the recipient client is communicatively coupled to at least at least one processor associated with an addressing service implementing the method as discussed in relation FIG. 1 as discussed above. Hereinafter references to the recipient client Alice or simply Alice or client is understood to refer to a device such as a digital wallet or computing resource associated with the client entity owned by Alice.

Step 202 depicts providing the alias associated with the client to the addressing service. In some embodiments, when the recipient client is integrated with the addressing device, then this is simply made accessible to the component or module of the device that carries out the function of the addressing device. When the client is separate from the addressing service, the client may send the alias associated with it using a secure communication protocol such as HTTPS etc. over a communication network such as the Internet.

Following on from the above example, the recipient client Alice may then send her alias alice@nchain.com to the addressing service. In some embodiments, the location or endpoint URI of the addressing service may be obtained from a machine readable resource associated with a well-known location for the addressing service. For example, if the addressing service is bsvalias as mentioned in the background, the machine readable resource may be accessed from the location https://<host-discovery-taret>:<host-discovery-port>/.well-known/bsvalias.

In step 202, the recipient client Alice inputs or specifies a number of words for a code that is to be associated with the alias in step 202 to the addressing service. This way, the client can choose the level of certainty for error-resistance as explained above in relation to the first aspect. The greater the number of words, the less prone to errors. In order to ensure that the code words are memorable, usually 1 to 3 or 4 may be used. More number of words may be used for aliases associated with highly sensitive matters or data.

In step 203, the recipient client Alice obtains the code from the addressing service. This step occurs after the addressing service performs the steps explained in relation to FIG. 1. Thus the resulting code "unique monkey" is returned to Alice.

In step 204, when Alice wishes to send a sender client, for instance Bob, a means to pay her, Alice sends her alias alice@nchain.com to Bob's public address (using known mechanisms and public keys for example) along with the code "unique monkey".

Figure 3:
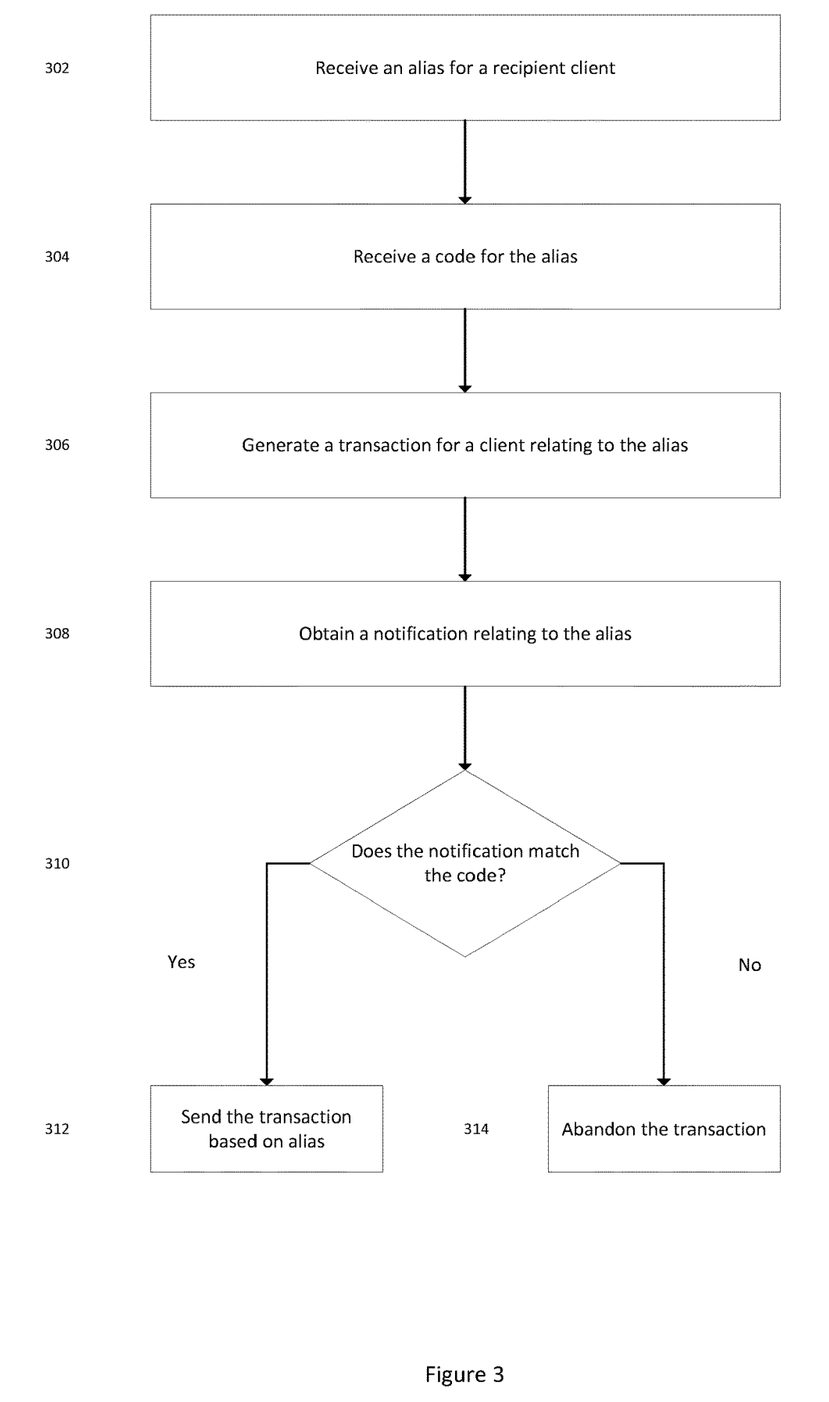
FIG. 3 is a flowchart depicting a method pertaining to blockchain transaction based on an alias for a recipient client, where the method is implemented by one or more processors associated of a sender client.

FIG. 3 of the present disclosure depicts a method performed by one or more processors associated with a sender client, i.e. Bob's device or digital wallet associated with a computing device for Bob. Hereinafter references to the sender client Bob or simply Bob or client is understood to refer to a device such as a digital wallet or computing resource associated with the client entity owned by Bob.

Step 302 depicts the step of receiving an alias for a recipient client, the alias being associated with a public address for the recipient client. In the above discussed example, the alias received is for the recipient client Alice, and is alice@nchain.com. This alias is considered to be received when either the alias is typed in by the sender Bob in his digital wallet after being received either over the phone or in conversation with Alice; or when the alias is sent via e-mail; or by copying from an electronic resource into a digital wallet for Bob. In some instances, voice recognition software may also be used to capture the alias mentioned to the owner Bob in conversation.

In step 304, the code is also received by Bob. This code may be provided by Alice along with the alias in step 302. In the above example, the code is "unique monkey". The code may be received along with the alias, similar to how the alias is received in the above step. In some embodiments the code may be stored in Bob's wallet or any other storage module associated with Bob once received by Bob.

In step 306, when Bob wants to make a payment to Alice, then Bob commences this process by generating a transaction associated with the distributed ledger based on the alias for Alice. To do this, in many instances Bob will enter the received alias alice@nchain.com into his wallet so that a digital asset can be sent to this alias.

In step 308, a notification related to the alias is received at Bob's wallet or device. This notification is in some embodiments provided from an addressing service such as described in relation to FIG. 1. The notification is related to the code word that is associated with the alias entered into the wallet when generating the transaction in step 306.

In step 310, based on the notification it can then be verified if the code word in the notification matches the code received for the recipient client Alice in step 304. In some embodiments, the sender Bob may enter the received code obtained in step 304 via a user interface for comparison with the notification. In other embodiments, if the received code is obtained in step 304 over the phone, this received code is simply checked against the notification received in step 308. In other embodiments, if the received code is stored in a digital wallet or storage associated in Bob, then the check to identify a match against the notification in step 308 may be automatically performed using one or more processors associated with said digital wallet or storage.

In step 312, if the correct alias alice@nchain.com is entered in step 306, then the notification in step 208 will return the code "unique monkey". In this case, the code in steps 304 and 308 match and the transaction in step 306 is allowed to progress so that payment can be made from Bob to Alice.

In step 314 if any other alias is entered in step 306 instead, then either no code will be returned, or an error message will be returned if the entered alias does not relate to any entity. If the entered alias is indeed a valid alias for a payment address, such as a alise@nchain.com, then a different code, i.e. blue blossom, is returned instead. Thus, it will then be determined that the alias is not correct for the intended recipient Alice, and the transaction in step 306 can be disregarded or abandoned.

Figure 4:
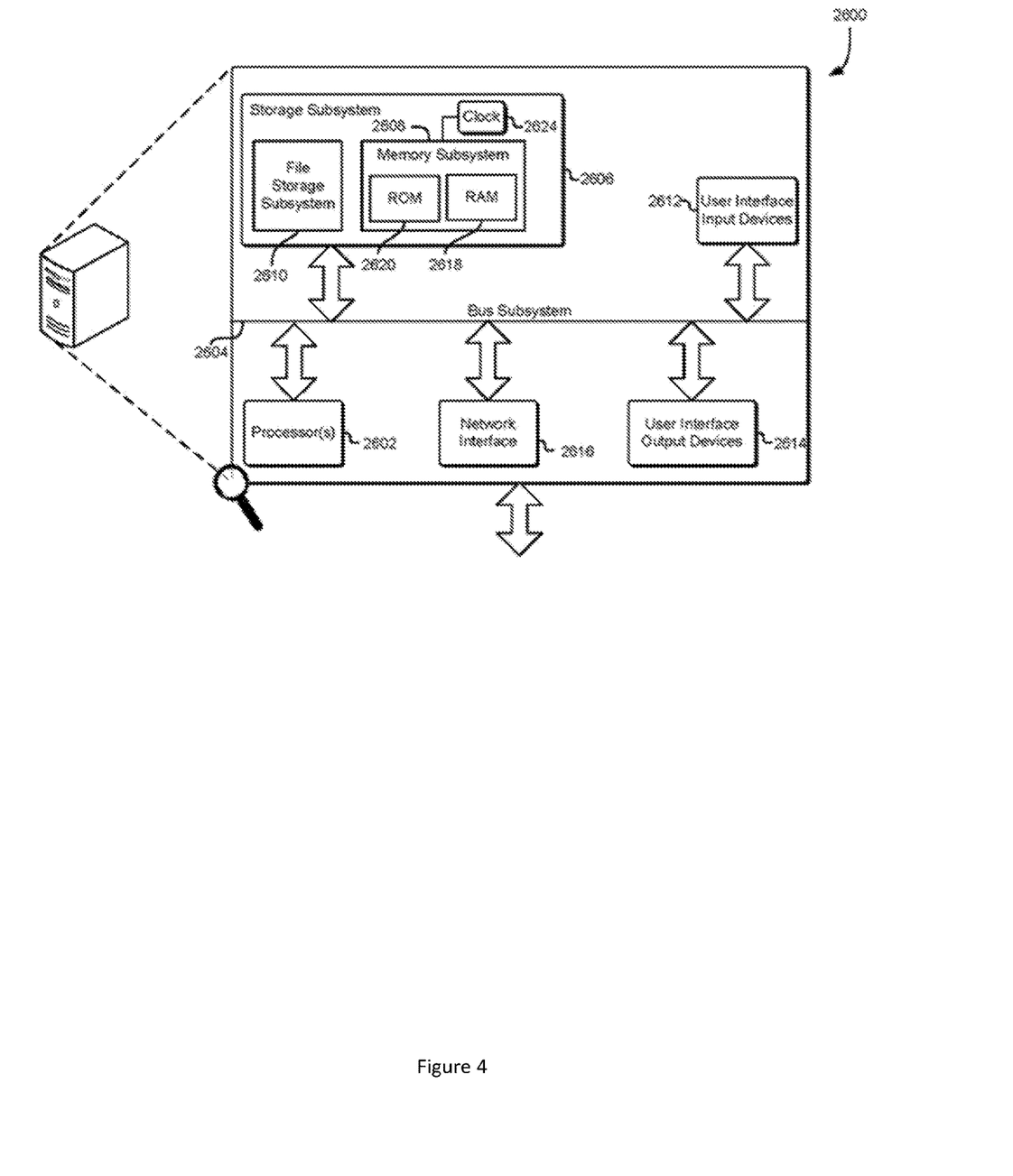
FIG. 4 is a schematic diagram illustrating a computing environment in which various aspects and embodiments of the present disclosure can be implemented.

Turning now to FIG. 4, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured to be used as one or more components of DBMS of FIG. 4, or the computing device 2600 may be configured to be a client entity that is associated with a given user, the client entity making database requests for a database that is managed by the DBMS of FIG. 4. Thus, computing device 2600 may be a portable computing device, a personal computer, or any electronic computing device. As shown in FIG. 4, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilise multiple buses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 4 is intended only as a specific example for purposes of illustrating the preferred embodiment of the device. Many other configurations having more or fewer components than the system depicted in FIG. 4 are possible.

Enumerated Example Embodiments

The present disclosure is hereby discussed based on the following clauses that are related to the above aspects, which are provided herein as exemplary embodiments for better explaining, describing and understanding the claimed aspects and embodiments.

1. A computer implemented method of implementing an addressing service for transactions associated with a distributed ledger, wherein an alias is provided for a client among one or more clients associated with the addressing service, the alias being specific to the client, each client being provided with a respective alias, the method implemented by one or more processors associated with the addressing service, the method comprising the steps of:
obtaining or accessing a plurality of seed words;
for a given alias associated with a given client among the one or more clients, encoding the alias and applying a hash function to the encoded alias to obtain a hash value;
extracting a first series from the hash value;
determining at least one seed word from the plurality of seed words based on the first series, the at least one seed word representing a code for the given alias; and
providing the code to the client associated with the given alias.

2. The method as set out in clause 1 wherein the first series is a first series of integers.

3. The method as set out in any preceding clause comprising receiving an input representing a number of words for the given client and determining said number of seed words for the code associated with the given alias.

4. The method as set out in any preceding clause wherein the hash function is re-applied to the obtained hash value to obtain a further hash value, the further hash value providing a further series.

5. The method as set out in clause 4 wherein the further series is a further series of integers.

6. The method as set out in any one or clauses 4 or 5 wherein the hash function is further reapplied at least once, each further reapplication being to a respective previously obtained further hash value.

7. The method as set out in any one of clauses 4 to 6 further comprising the steps of: updating a machine readable resource associated with the addressing service, the machine readable resource being provided at or accessible from a predictable or known location associated with the addressing service, the machine readable resource comprising:
one or more instructions for accessing or obtaining a public address associated with a given alias, the public address used for facilitating transactions associated with the alias; and
an entry specifying the number of hashes required to produce one or more series for the code associated with a given client.

8. The method as set out in any preceding clause, wherein the alias is associated with a domain name.

9. The method as set out in 8 when dependent on clause 7, further comprising providing an entry associated with the domain name in a directory, said entry specifying the number of hashes required to produce the one or more series for the code associated with a given client.

10. The method as set out in any one of the preceding clauses further comprising,
identifying a plurality of variations of the given alias;
for each variation identified, encoding the variation and applying the hash function to the encoded variation to obtain a variation hash value;
extracting a second series from the variation hash value;
comparing the second series with the first and/or one or more further series associated with the given alias;
based on a collision criterion, disregarding one or more of the first and/or further series for determining a code for the given alias.

11. The method as set out in clause 10 wherein the first and/or second and/or further series are series of integers.

12. The method as set out in clause 10 or 11 wherein the collision criterion is a Levenshtein distance between the respective series being compared.

13. A computer implemented method associated with a transaction for a distributed ledger, wherein an alias is provided for a client among one or more clients associated with an addressing service, the alias being specific to the client, each client being associated with a respective alias, the method implemented by one or more processors associated with a client among the one or more clients, the method comprising the steps of:
providing the alias associated with the client to an addressing service;
providing a number of words for a code that is to be associated with the alias to the addressing service;
obtaining the code from the addressing service; and
sending the alias and the associated code to a sender client for use in a transaction associated with the distributed ledger for the client, the client being the recipient for said transaction.

14. The method as set out in clause 13 further comprising the method steps of any one of clauses 1 to 12 implemented by the addressing service.

15. The method as set out in clause 14 wherein the addressing service is a computing resource integrated with the client.

16. The method as set out in clause 14 wherein the addressing service is an entity remote or separate to the client, wherein the client is communicatively coupled to the addressing service via a wired or wireless communication network.

17. A computer implemented method associated with a transaction for a distributed ledger, wherein an alias is provided for a client among one or more clients associated with an addressing service, the alias being specific to the client, each client being associated with a respective alias, the method implemented by one or more processors associated with a client among the one or more clients, the method comprising the steps of:
receiving an alias for a recipient client, the alias being associated with a public address for the recipient client;
receiving a code associated with the received alias;
generating a transaction associated with the distributed ledger based on the alias;
obtaining a notification relating to the alias; and
based on a determination that the notification matches the received code, sending the generated transaction based on the alias; or
based on a determination that the notification does not match the received code, disregarding or deleting the generated transaction.

18. A computing device or system, comprising:
  at least one a processor; and
  memory including executable instructions that, as a result of execution by the at least one processor, causes the computing device or system to perform the computer-implemented method of any one of clauses 1 to 12 implementing the addressing service.
19. A computing device or system, comprising:
  at least one a processor; and
  memory including executable instructions that, as a result of execution by the at least one processor, causes the computing device or system to perform the computer-implemented method of any one of clauses 13 to 16 implementing the recipient client.
20. A computing device or system, comprising:
  at least one a processor; and
  memory including executable instructions that, as a result of execution by the at least one processor, causes the computing device or system to perform the computer-implemented method of clause 17 implementing the sender client.
21. The method as set out in any one of clauses 18 to 20 wherein the computing device is a digital wallet.
22. A system comprising:
  an addressing service as set out in clause 18;
  a recipient client as set out in clause 19; and
  a sender client as set out in clause 20;
  wherein the sender and the recipient clients are communicatively coupled via a first wired or wireless communication network, and wherein the recipient client and the addressing service are communicatively couple via a second wired or wireless communication network.
23. The system as set out in clause 22 wherein the first and second networks are the same or different to each other.
24. A non-transitory computer-readable storage medium having stored thereon executable instructions that, as a result of being executed by a processor of a system or computing device, cause the system or computing device to perform the computer-implemented method of any one of clauses 1 to 17.

It should be noted that the above-mentioned aspects and embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer implemented method of implementing an addressing service for transactions associated with a distributed ledger, wherein an alias comprising a sequence of characters including a domain name is provided for a client among one or more clients associated with the addressing service, the alias being specific to the client, each client being provided with a respective alias, the method implemented by one or more processors associated with the addressing service, the method comprising the steps of:
  obtaining or accessing a plurality of seed words, each being a word in a language;
  for a given alias associated with a given client among the one or more clients, encoding the alias and applying a hash function to the encoded alias to obtain a hash value;
  extracting a first series comprising a sequence of characters from the hash value;
  determining a set of possible seed words from the plurality of seed words based on the first series;
  determining at least one seed word from the set of possible seed words, the at least one seed word representing a code for the given alias; and
  providing the code to the client associated with the given alias;
  receiving a code and an alias from a recipient client among the one or more clients associated with the addressing service; and
  granting a transaction when the received code matches a code and alias combination as according to the distributed ledger.

2. The method of claim 1 wherein the first series is a first series of integers.

3. The method of claim 1 comprising receiving an input representing a number of words for the given client and determining the at least one seed word for the code associated with the given alias.

4. The method of claim 1 wherein the hash function is re-applied to the obtained hash value to obtain a further hash value, the further hash value providing a further series; and the code provided to the client is determined based on the further series.

5. The method of claim 4 wherein the further series is a further series of integers.

6. The method of claim 4 wherein the hash function is further reapplied at least once, each further reapplication being to a respective previously obtained further hash value, and the code provided to the client is determined based on a series extracted from one of the further hash values.

7. The method of claim 4 further comprising the steps of: updating a machine readable resource associated with the addressing service, the machine readable resource being provided at or accessible from a predictable or known location associated with the addressing service, the machine readable resource comprising: one or more instructions for accessing or obtaining a public address associated with a given alias, the public address used for facilitating transactions associated with the alias; and an entry specifying a number of hashes required to produce one or more series for the code associated with a given client.

8. The method of claim 7, further comprising providing an entry associated with the domain name in a directory, the entry specifying the number of hashes required to produce the one or more series for the code associated with a given client.

9. The method of claim 1 further comprising,
  identifying a plurality of variations of the given alias;
  for each variation identified, encoding the variation and applying the hash function to the encoded variation to obtain a variation hash value;

extracting a second series from the variation hash value;
comparing the second series with the first and/or one or more further series associated with the given alias;
based on a collision criterion, disregarding one or more of the first and/or further series for determining a code for the given alias.

10. The method of claim 9 wherein the first and/or second and/or further series are series of integers.

11. The method of claim 9 wherein the collision criterion is a Levenshtein distance between the respective series being compared.

12. A computing device, comprising:
at least one a-processor; and
memory including executable instructions that, as a result of execution by the at least one processor, causes the computing device or system to perform a computer-implemented method of implementing an addressing service for transactions associated with a distributed ledger, wherein an alias comprising a sequence of characters including a domain name is provided for a client among one or more clients associated with the addressing service, the alias being specific to the client, each client being provided with a respective alias, the method implemented by one or more processors associated with the addressing service, the method comprising the steps of:

obtaining or accessing a plurality of seed words, each being a word in a language;
for a given alias associated with a given client among the one or more clients, encoding the alias and applying a hash function to the encoded alias to obtain a hash value;
extracting a first series comprising a sequence of characters from the hash value;
determining a set of possible seed words from the plurality of seed words based on the first series;
determining at least one seed word from the set of possible seed, the at least one seed word representing a code for the given alias; and
providing the code to the client associated with the given alias;
receiving a code and an alias from a recipient client among the one or more clients associated with the addressing service; and
granting a transaction when the received code matches a code and alias combination as according to the distributed ledger.

13. The computing device of claim 12 wherein the computing device is a digital wallet.

* * * * *